United States Patent

Jacobson

[15] 3,653,267

[45] Apr. 4, 1972

[54] IN A HYDROSTATICALLY SUPPORTED GYROSCOPE A FLEXIBLE TUBE PUMP PROVIDING FLUID CIRCULATION TO HYDROSTATIC BEARINGS OF THE GYROSCOPE

[72] Inventor: Oscar D. Jacobson, New York, N.Y.

[73] Assignee: The Bendix Corporation

[22] Filed: May 7, 1969

[21] Appl. No.: 822,524

[52] U.S. Cl..................................74/5, 74/5.5, 417/383
[51] Int. Cl..........................................G01c 19/20
[58] Field of Search..............74/5, 5.5; 308/9 A; 103/148, 103/150, 152, 1, 440; 417/383

[56] References Cited

UNITED STATES PATENTS

| | | |
|---|---|---|
| 2,007,482 | 7/1935 | Stitt..........................................103/1 X |
| 2,377,251 | 5/1945 | Leclair....................................103/44 |
| 2,888,877 | 6/1959 | Shellman et al....................103/152 X |
| 2,899,905 | 8/1959 | Becher..............................103/152 X |
| 2,900,916 | 8/1959 | Peras..................................103/152 X |
| 2,952,210 | 9/1960 | Clancy...............................103/148 X |
| 3,267,744 | 8/1966 | Baldwin et al. ............................74/5 |
| 3,323,374 | 6/1967 | Durkee et al. ..............................74/5 |
| 3,362,231 | 1/1968 | Baldwin et al. ............................74/5 |

Primary Examiner—Manuel A. Antonakas
Attorney—Anthony F. Cuoco and Plante, Hartz, Smith & Thompson

[57] ABSTRACT

A combination in a hydrostatically supported gyroscope of a flexible tube pump of a Bourdon tube type in an assembly including a motor means or electrically controlled solenoid to actuate the flexible tube in an arrangement in which the tube functions as a low power input pump which may be utilized to supply a liquid pressure medium to hydrostatically support bearings of the gyroscope.

12 Claims, 10 Drawing Figures

INVENTOR.
Oscar D. Jacobson
BY

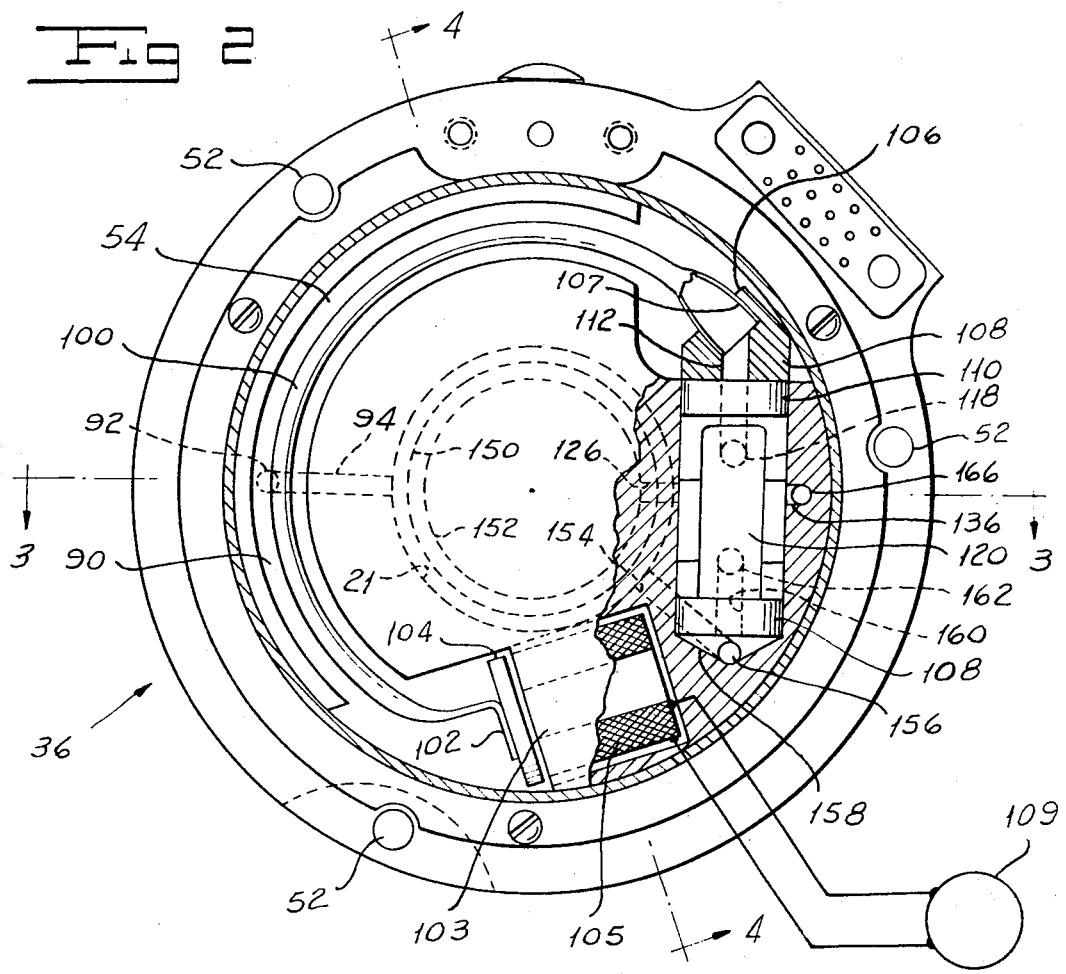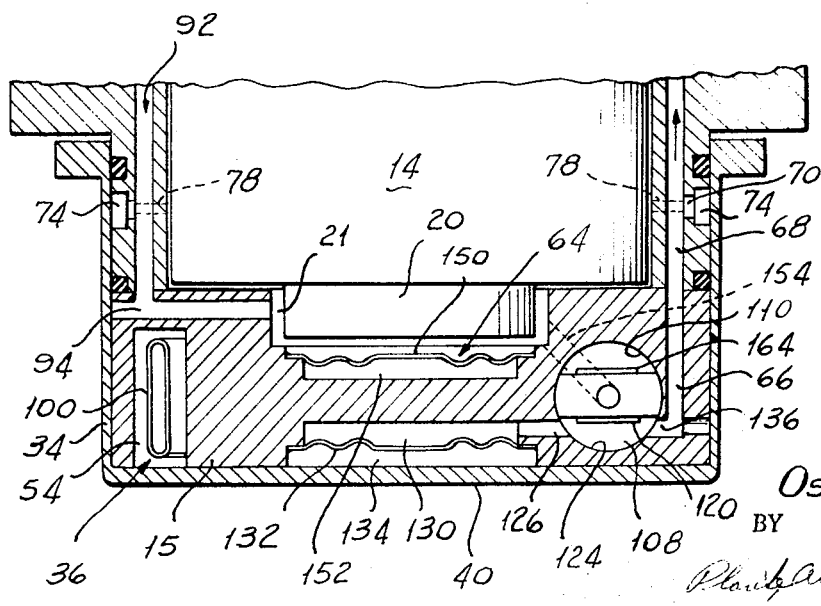

INVENTOR.
Oscar D. Jacobson

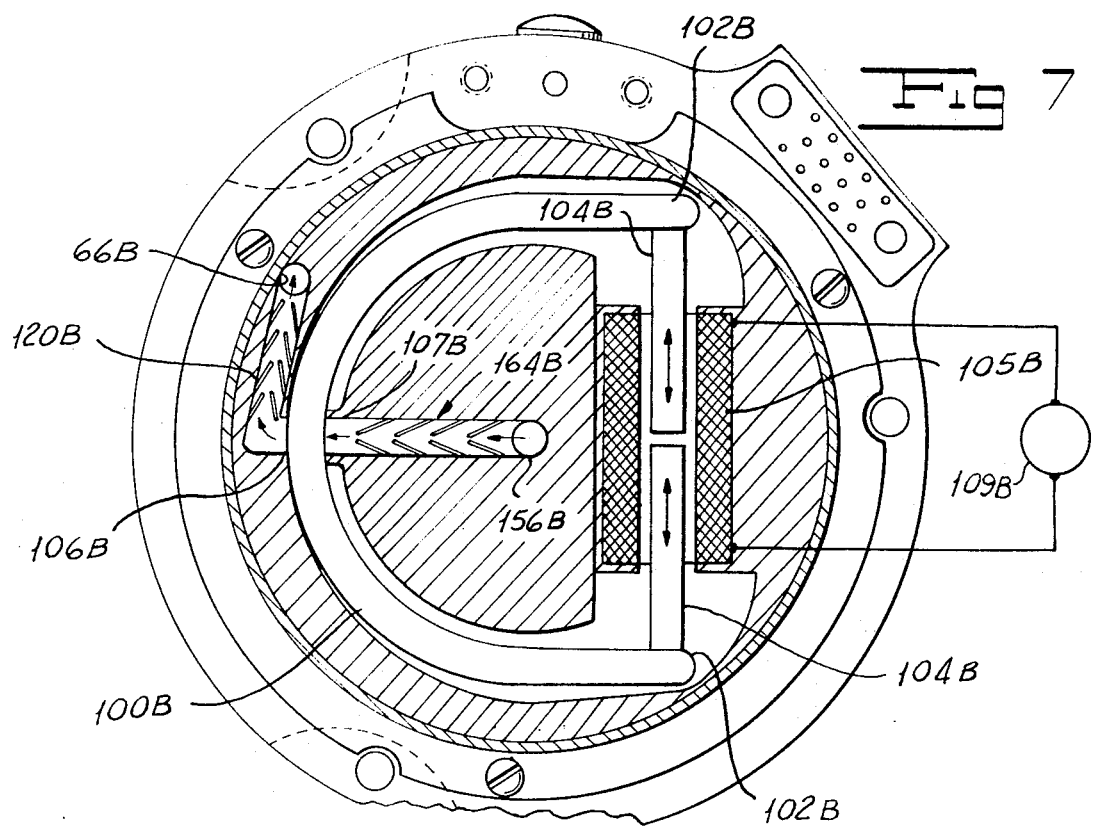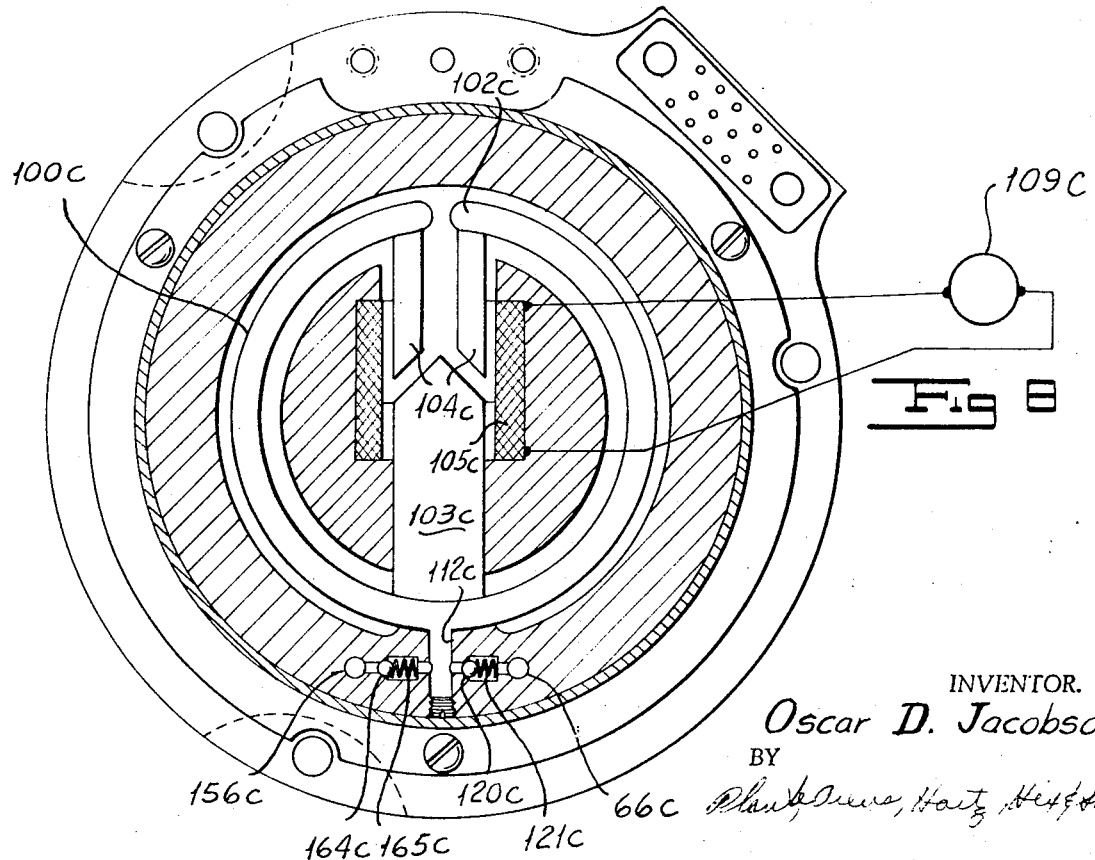

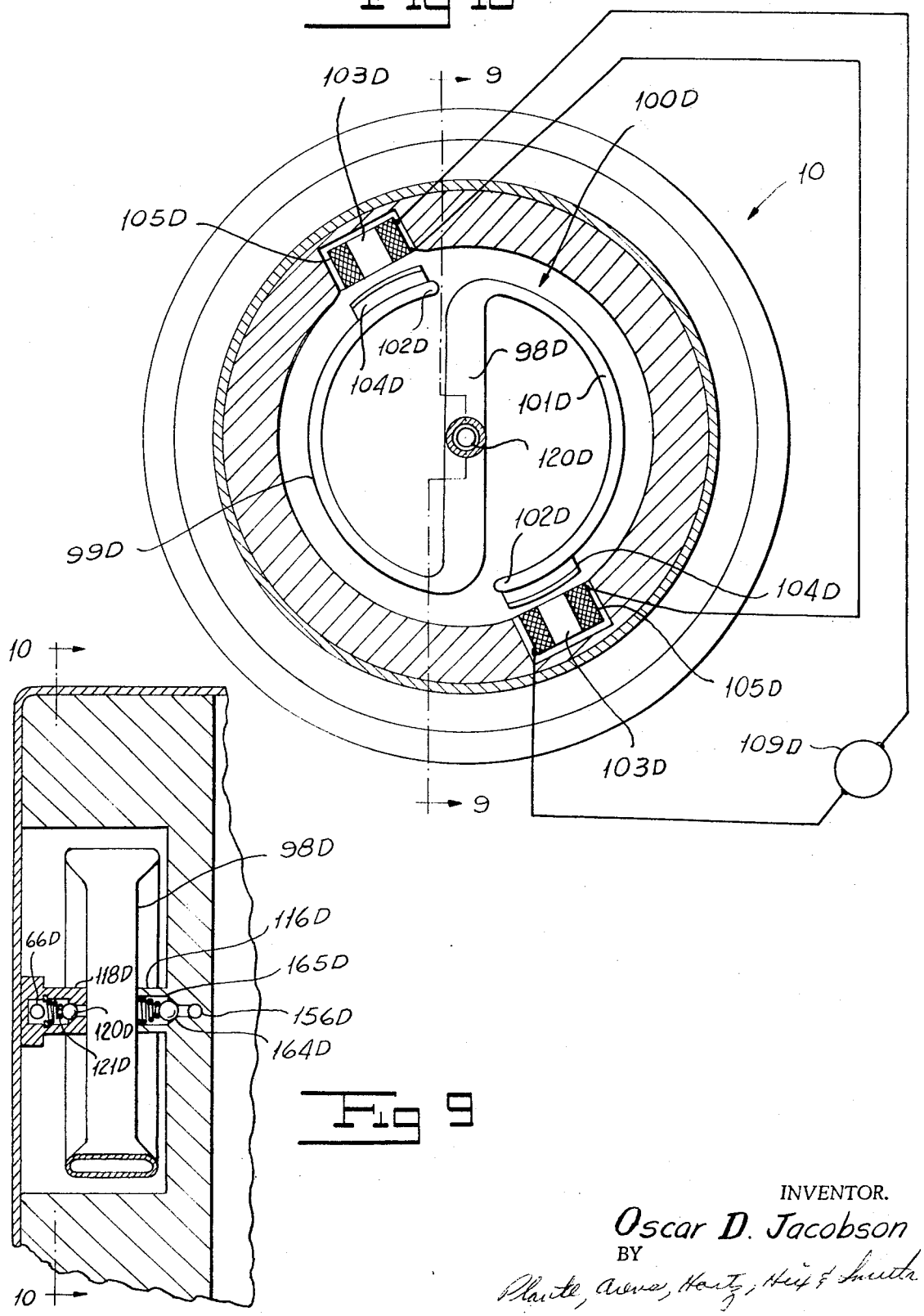

IN A HYDROSTATICALLY SUPPORTED GYROSCOPE A FLEXIBLE TUBE PUMP PROVIDING FLUID CIRCULATION TO HYDROSTATIC BEARINGS OF THE GYROSCOPE

CROSS-REFERENCE TO RELATED APPLICATIONS

The present application relates to hydrostatically supported gyroscope embodying an improved compact flexible tube pump assembly for use in supplying a liquid medium under pressure to hydrostatically supported gimbal elements of the gyroscope of a type such as described in a copending U.S. application Ser. No. 807,232 filed Mar. 14, 1969 by Oscar D. Jacobson, the inventor of the present invention and assigned to The Bendix Corporation, assignee of the present invention.

BACKGROUND OF THE INVENTION

1. Field of the Invention

This invention relates to a field of hydrostatically supported gyroscopes in which low power input pumps may be utilized to supply liquid pressure medium to hydrostatically support bearings of a gyroscope, in an arrangement in which power efficiency is important in order to minimize heating problems.

2. Description of the Prior Art

Heretofore, there has been provided, as disclosed in a U.S. Pat. No. 3,362,231 granted Jan. 9, 1968 to Roland G. Baldwin et al., a pump assembly in combination with a gyroscope to provide a fluid medium under pressure for hydrodynamically supporting the rotor and gimbal elements of the gyroscope.

In the apparatus of the reference patent, the pump assembly effects an inward pumping action to a hydrodynamic journal bearing of a rotor member of the gyroscope through the provision of inwardly diminishing or converging grooves in the stator of the pump assembly.

There is inherent in the arrangement of the reference patent a high viscous drag on the rotor element of the gyroscope in that the rotor element drives an element of the pump assembly. This arrangement of the patent requires a delicate balance between the speed of rotation of the rotor of the gyroscope and the pumping action required by the pumping assembly which is not separately operable in the reference patent from the rotor of the gyroscope, as in the case of the present invention.

Moreover in the present invention there is provided an efficient resilient tube pump with no wear points which would contaminate the liquid being pumped, as distinguished from gear pumps which in small sizes have been found to be relatively inefficient.

There has been further noted a U.S. Pat. No. 2,888,877, granted June 2, 1959 to Kenneth S. Shellman and Melvin A. Crosby for a pumping apparatus in which there is provided a solenoid actuated flexible spring element acting on a flexible tube to provide a pulsating pumping action.

Also there has been noted a U.S. Pat. No. 3,357,360 granted Dec. 12, 1967 to George L. Borell and showing the use of check valves at the outlet of a pulsating diaphragm pump. Moreover a U.S. Pat. No. 3,173,372 granted Mar. 16, 1965 to Howard A. Baldwin has been further noted as of interest in showing another form of pump operated by the successive springing of a tube to provide a pumping action.

There is no suggestion in any of the aforenoted patents of a motor or an electrically controlled solenoid operated Bourdon type tube pump in which two valve means (one at the inlet, and the other at the outlet) serve to rectify the oscillating fluid output of the tube as it vibrates; nor do the cited references suggest the several forms of the invention in which there may be provided reed valves or spring biased ball valves to control the fluid inlet and outlet of the Bourdon type tube pump, while still another form of the invention may include the feature of jet type valves arranged at the inlet and outlet of the Bourdon type tube pump so as to provide no moving parts.

Furthermore, the aforenoted patent references fail to suggest the further modified form of invention, including Bourdon type tubes arranged in a balanced relation so as to be resistant to shock and vibration; nor an arrangement in which upon an actuating solenoid being energized, an armature moves toward it bending a Bourdon type tube so as to decrease the interior volume of the tube and forcing the fluid in it through an outlet valve into a resilient outlet chamber and an outlet port, while upon the solenoid being deenergized, the tube springs back under an inherent spring force therein increasing the volume within it resulting in a fluid flow from a resilient inlet chamber and through an inlet valve into the interior of the tube and in which the resilient inlet and outlet chambers serve to prevent cavitation problems.

Moreover there is no suggestion in the cited references of the further feature of providing an energizing current for the solenoid of an electrical input frequency such as to match the mechanical resonant frequency of the Bourdon tube, so that very little energy need be used to operate the device; nor do the cited references suggest the use of reed valves as in the present invention which may be tuned to the same natural frequency as that of the Bourdon tube.

SUMMARY OF THE INVENTION

The present invention relates to a compact flexible tube pump in an assembly including one end of a Bourdon type tube connected to a stationary valve housing which is mounted in a cavity of an end plate of a housing in which there is hydrostatically supported bearings of a gyroscope and in which arrangement the other end of the tube is operatively connected to a movable armature which is actuated by an electrically controlled motor means or solenoid and in which arrangement suitable inlet and outlet fluid control valves are so arranged as to rectify the oscillating fluid output of the tube as it vibrates.

Another object of the invention is to provide in the aforenoted valve means a pair of reed valves tuned to the same natural period as the flexible tube so as to efficiently rectify the oscillating fluid output of the tube as it vibrates.

A further object of the invention is to provide in the aforenoted valve means an arrangement of spring biased ball valves to control the fluid inlet and the fluid outlet of the Bourdon type tube pump.

Another object of the invention is to provide in the aforenoted valve means jet type valves arranged at the inlet and outlet of the Bourdon type tube pump so as to provide no moving parts, while serving to rectify the oscillating fluid output of the tube as it vibrates.

Another object of the invention is to provide such a Bourdon type tube pump arranged in a balanced relation so as to be resistant to shock and vibration.

A further object of the invention is to provide in the aforenoted arrangement of the Bourdon type tube pump a solenoid which upon energization actuates an armature so as to move in a sense to bend the Bourdon tube and effectively decrease the interior volume of the tube forcing a fluid therein through an outlet control valve into a resilient chamber outlet port, while upon deenergization of the actuating solenoid an inherent resilient spring force in the tube biases the tube back to its previous condition increasing the interior volume thereof so as to cause a resulting flow of a fluid medium through the inlet valve into the tube and in which arrangement cavitation problems may be avoided by pressurizing the entire system and providing a resilient intake chamber.

Another object of the invention is to so provide the electrical energizing current for this actuating solenoid of a frequency such as to match the mechanical resonant frequency of the Bourdon type tube device so that very little energy need be used to operate such pumping device.

These and other objects and features of the invention are pointed out in the following description in terms of the embodiments thereof which are shown in the accompanying drawings.

DESCRIPTION OF THE DRAWINGS

In the drawings in which corresponding parts have been indicated by corresponding numerals.

FIG. 2 is a fragmentary sectional end view taken along the lines 2—2 of FIG. 1 and looking in the direction of the arrows so as to show the Bourdon type flexible tube pump, together with an actuating solenoid having an armature connected to one end of the Bourdon type tube pump while the other end of the tube has an outlet connected to a valve housing having therein a pair of reed valves (one in the inlet, and the other in the outlet of the pump) so as to serve to rectify the oscillating fluid output of the tube pump as it vibrates.

FIG. 3 is a sectional view of FIG. 2 taken along the lines 3—3 and looking in the direction of the arrows and showing in greater detail a resilient chamber at the outlet port of the reed valve effective upon energization of the actuating solenoid, together with the further feature of a resilient intake chamber at an inlet port to the Bourdon type tube pump controlled by another reed valve which becomes effective upon deenergization of the actuating solenoid.

FIG. 7 is a sectional end view of a gyroscope housing showing a further modified form of the flexible tube pump with an actuating solenoid shown operatively connected to opposite ends of the flexible tube of the pump with the inlet and outlet to the pump being arranged intermediate opposite ends of the flexible tube and including jet type valves arranged at the inlet and outlet of the Bourdon type tube pump so as to provide no moving parts.

FIG. 8 is a sectional end view of gyroscope housing and showing a further modified form of the flexible tube pump with an actuating solenoid operatively connected in a somewhat different arrangement in which the inlet and outlet of the pump of the latter form of the invention is effectively controlled by spring biased ball valves.

FIG. 9 is a fragmentary side sectional view of a further modified form of the Bourdon tube type pump showing a central inlet-outlet to the pump controlled by spring biased ball valves.

FIG. 10 is a sectional end view of FIG. 9 taken along the lines 10—10 of FIG. 9 and looking in the direction of the arrows and showing opposite end portions of the Bourdon type tube pump arranged in a balanced relation so as to provide greater resistance to shock and vibrational forces.

DESCRIPTION OF THE INVENTION

Figure 1:
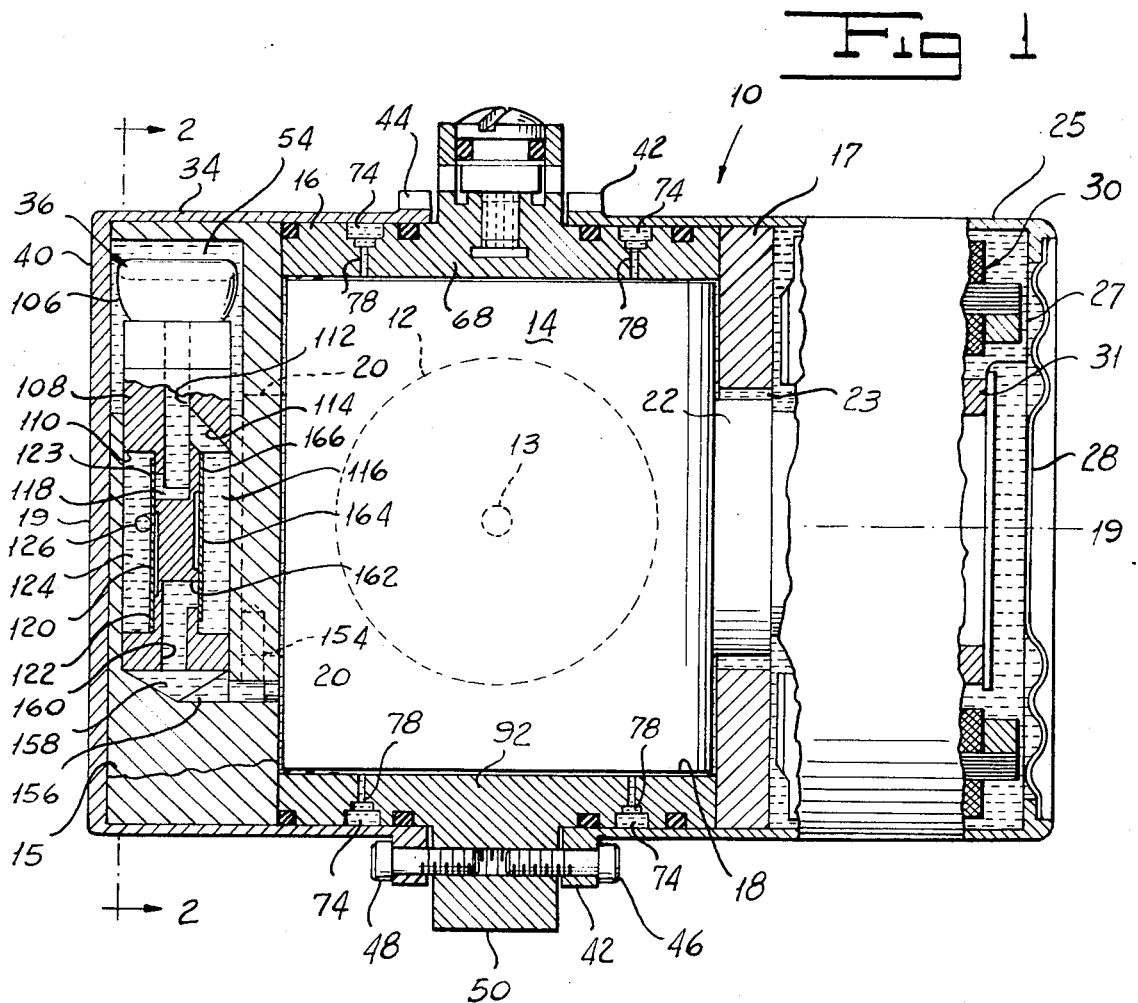
FIG. 1 is a side view, partly in section of a single degree of freedom gyroscope, including a resilient tube pump embodying the present invention and so arranged as to provide the required fluid pressure medium and flow to hydrostatic bearing means to operatively support the gimbal element of the gyroscope relative to the pivotal axis thereof.
Figure 4:
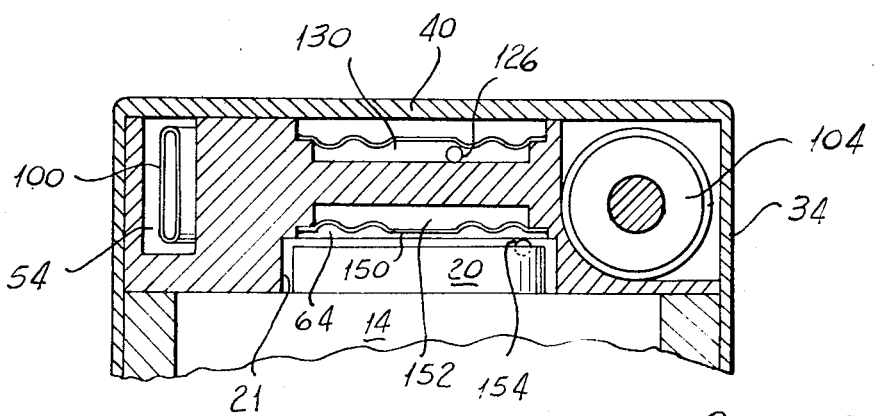
FIG. 4 is a sectional view of FIG. 2 taken along the lines 4—4 and looking in the direction of the arrows so as to show the further operative arrangement of the resilient chambers in relation to the actuating solenoid and Bourdon type tube.

Referring now to FIGS. 1 and 2, reference numeral 10 indicates a single degree of freedom gyroscope having a rotor element of conventional type indicated by dash line 12 and rotatably mounted about a first axis 13 in a cylindrical gimbal element 14. A cylindrical housing 16 is provided with end plates 15 and 17 so as to define a substantially cylindrical chamber 18 in which is mounted the gimbal element 14 of the gyroscope 10. The gimbal element 14 may be angularly positioned by the gyroscopic action of the single degree of freedom gyroscope 10 about a second axis 19—19 perpendicular to the first axis 13.

The cylindrical gimbal element 14 is positioned within the cylindrical chamber 18 in a slightly spaced relation to side wall surfaces of the cylindrical housing 16 and the end plates 15 and 17 defining the chamber 18 so as to provide a hydrostatic bearing means for the gimbal element 14, as here in after explained.

The cylindrical gimbal element 14 further includes at opposite end portions thereof axially projecting cylindrical shaft portions 20 and 22 having surfaces positioned in spaced relation to surfaces defining recesses 21 and 23 formed in the end plates 15 and 17 of the housing 16. These surfaces are so arranged in spaced relation as to cooperate in providing a hydrostatic bearing means upon which the gimbal element 14 may be angularly positioned about the longitudinal axis indicated by the reference numeral 19—19. Thus the surfaces of the shaft portions 20 and 22 cooperate with the surfaces defining the recesses 21 and 23 spaced apart therefrom so that a liquid medium supplied to the spaces between these surfaces form hydrodynamic bearings which support the gimbal element 14 for angular movement about the axis 19—19.

Positioned on one end portion of the housing 16 is a cylindrical casing 25 providing a chamber 27 having a fluid expansion diaphragm 28 mounted in an end of the casing 25 opposite from the housing 16. Mounted in the casing 25 and in spaced relation to the diaphragm 28 is a suitable electronic pick-off device indicated generally by the numeral 30 and which may be of a type well known in the art such as a synchro or other suitable electronic signal device having a rotor element 31 operably connected to the shaft portion 22 of the gimbal 14. The electronic pick-off device 30 is electrically connected so as to provide electrical signals in a conventional manner indicative of the angular position of the gimbal 14 effected by the gyroscope 10.

The electronic pick-off device 30 and the expansion diaphragm 28 are mounted in the cylindrical casing 25 which is in turn mounted on the one end portion of the housing 16. At an opposite end portion of the housing 16 there is mounted another cylindrical casing 34 in which there is in turn mounted a compact tubular pump 36 embodying the subject matter of the present invention.

The tubular pump 36 includes the end plate 15 so arranged as to provide a pump block sandwiched between an end of the housing 16 and an end plate 40 of the casing 34 provided at an opposite end of the cylindrical casing 34 from the housing 16. The casings 25 and 34 have annular flanges 42 and 44, respectively, projecting radially from the inner ends thereof and secured in position, as shown by FIG. 1, by bolts 46 and 48 screw threadedly engaged in an annular flange 50 projecting radially from the housing 16 and intermediate the opposite ends of the housing 16. As shown by FIG. 2, fastening holes 52 are provided in the flange 50 whereby the gyroscope 10 may be suitably affixed to an aircraft for operation.

The end plate 15 provides a pump block in which there is formed a recess 54 in which there is positioned in cooperative relation a Bourdon type flexible tubular pump 36 having an inlet fluid pressure chamber and an outlet fluid pressure chamber for the tubular pump 36 as hereinafter explained.

An outlet port 66 provided in the end plate 15 leads from the fluid pressure chamber of the pump 36 to a longitudinally extending fluid pressure channel 68 provided in the housing 16. The fluid pressure channel 68 in turn opens at ports 70 into annular fluid pressure channels 74, respectively, which in turn feed through a plurality of ports 78 passing through the wall of the housing 16 and into the cylindrical chamber 18 so as to provide a fluid pressure medium about the cylindrical surface of the gimbal element 14 to provide the required pressure and flow to effect a hydrostatic bearing means between the inner surface of the housing 16 and the cylindrical surface of the gimbal element 14 positioned in spaced relation thereto so as to support the cylindrical gimbal element 14 relative to the cylindrical surface of the chamber 18 for angular movement about the axis 19—19.

The recess 21 formed in the pumping block of the end plate 15 opens into the fluid pressure inlet chamber of the tubular pump 36 so as to provide a fluid return passage, while the recess 23 formed in the end plate 17 at the opposite end of the housing 16 provides an outlet for the fluid pressure medium from the cylindrical chamber 18 providing a hydrostatic bearing means for the shaft portion 21 of the gimbal element 14. The recess 23 in turn leads into the chamber 27 in the casing 25 carrying the electronic pick-off device 30 and the fluid expansion diaphragm 28.

There is thus provided a fluid pressure chamber 27 in the casing 25, while there is provided in the end plate 17 a fluid pressure return port which opens from the chamber 27 into a longitudinally extending channel 92 formed in the housing 16. The channel 92, as shown by FIG. 3, in turn opens into a return channel 94 formed in the pumping block of the end plate 15, while the channel 94 leads into the recess 21 formed in the pumping block of the end plate 15. Surfaces of shaft portion 20 of the cylindrical gimbal element 14 are, as heretofore explained, positioned in spaced relation to surfaces of the recess 21 in the pumping block of the end plate 15. The recess 21 in turn conducts the returning fluid medium applied through the channel 94 to the fluid inlet chamber of the tubular pump 36 providing a hydrostatic bearing means for the shaft portion 20 of the gimbal element 14.

FLEXIBLE TUBE PUMP

Referring to the form of the invention illustrated by FIGS. 1, 2, 3 and 4, there the pump 36 is shown mounted in spaced relation in the chamber 54 formed in the pumping block of the end plate 15. The pump 36 includes a flexible tube 100 of the Bourdon tube type having a closed end portion 102 operably connected to an armature 104 normally biased under the inherent spring tension of the Bourdon tube 100 in a spaced relation to an electrical solenoid 105 arranged to actuate the armature 104 upon energization thereof by a suitable source 109 of pulsating direct current.

An opposite open end 107 of the Bourdon tube 100 is secured at 106 to a stationary reed valve housing 108 which is force fitted into a cavity 110 provided in the end plate 15 and which extends longitudinally in the stationary reed valve housing 108, as shown by FIG. 2.

A fluid inlet passage 114 leads from a chamber 116, as best shown in FIG. 1, into a passage 112, while a second opening or port 118 leading from the passage 112 is normally closed by a spring biased outlet reed valve 120. An end portion 122 of the flexible reed valve 120 is suitably secured to the stationary reed valve housing 108, while an opposite end portion 123 of the flexible reed valve 120 is movable in relation to the opening or port 118 and normally biased so as to close the opening 118, as shown in FIG. 1. The flexible reed valve 120 is movable so as to open the port 118 to an outlet pressure chamber 124 from which there leads a passage 126, as shown in FIGS. 1, 2 and 3 and 4.

The passage 126 best shown in FIG. 3, opens from the chamber 124 to a resilient fluid outlet reservoir chamber 130 having a diaphragm 132 extending between the chamber 130 and a second chamber 134 separated by the resilient diaphragm 132 from the chamber 130. The resilient fluid chamber 130, thus defined by the diaphragm 132, is connected through the passage 126 to the outlet chamber 124 and serves to even out the pulsating flow of fluid medium from the outlet of the Bourdon tube 100 as controlled by the outlet reed valve 120, as shown in FIG. 1.

Also leading from the outlet chamber 124 is a passage 136 which, as shown by FIG. 3, in turn opens into a passage 66 extending longitudinally so as to open into a longitudinally extending fluid pressure channel 68. The channel 92 in turn opens into a return channel 94 formed in the pumping block of the end plate 15. The channel 94 in turn leads into the recess 21 formed in the pumping block of the end plate 15, while surfaces of the shaft portion 20 of the cylindrical gimbal 14 are, as heretofore explained, positioned in spaced relation to surfaces of the recess 21. The recess 21 in turn conducts the returning fluid medium applied through the channel 94 to a fluid inlet chamber 64 which is in turn separated by a flexible diaphragm 150 from an intake reservoir air pocket 152 provided in the end plate 15.

Leading from the recess 21 is a fluid intake channel 154 which in turn leads through a fluid intake port 156, as shown by FIG. 2, to an intake chamber 158 at the lower end of the cavity 110 and immediately below the stationery reed valve housing 108. A channel 160 extends longitudinally through the stationary reed valve housing 108 to a port 162 which, as shown in FIG. 1, is controlled by a reed valve 164.

The reed valve 164 is normally biased under spring tension into a position closing the port 162 to the fluid intake channel chamber 158. The reed valve 164 is suitably fastened at the end 166 and may be biased so as to open the port 162 upon the pressure in the channel 160 exceeding that in the chamber 116, as hereinafter explained.

In the operation of the Bourdon type tube pump 100 of FIGS. 1 through 4, it will be seen that when the solenoid 105 is energized, the armature 104 moves towards the solenoid 105 bending the Bourdon type tube 100. This action in turn decreases the interior volume of the tube 100 forcing the fluid or liquid medium in the tube 100 through the passage 112 into the reed valve housing 108 so as to cause the reed valve 120 to open the port 118 leading into the pressure chamber 124, and causing in turn a fluid pressure to be applied through the passage 126 into the resilient chamber 130 and through the outlet passage 136 to channel 66 and there through to the longitudinally extending pressure channel 68 in the housing 16.

However on deenergization of the solenoid 105, the Bourdon type tube 100 springs back increasing the volume with the tube decreasing the fluid pressure in passage 112 whereupon the outlet control reed valve 120 is biased into a position closing the port 118 of the outlet control reed valve 120 while the resulting lower pressure applied in the chamber 116 causes the intake control reed valve 164 to open the port 162 resulting in a return fluid flowing through the inlet port 162 into the chamber 116, and channel 114 and passage 112 so as to be drawn through the opening 107 into the interior of the Bourdon tube 100.

Cavitation problems, at this point, may be avoided by pressurizing the entire system and by providing the further feature of the resilient intake chamber 64 subject to the resilient force of the diaphragm 150.

Moreover as a further feature, the electrical input frequency of the energizing current applied by the source 109 to the solenoid 105 is so selected as to match the mechanical resonant frequency of the Bourdon type tube 100 so that very little energy need be used to effect the resilient bending of the Bourdon tube 100 upon the energization and deenergization of the solenoid 105.

Also the reed valves 120 and 164, as an additional feature, are tuned to the same natural period as that of the Bourdon tube 100. However, it will be seen that the two reed valves including the inlet reed valve 164 and the outlet reed valve 120 serve to rectify the oscillating fluid output of the tube 100, as it vibrates under the forces effected by the energization and deenergization of the solenoid 105.

MODIFIED FORM OF FIGURES 5 AND 6

Figure 5:
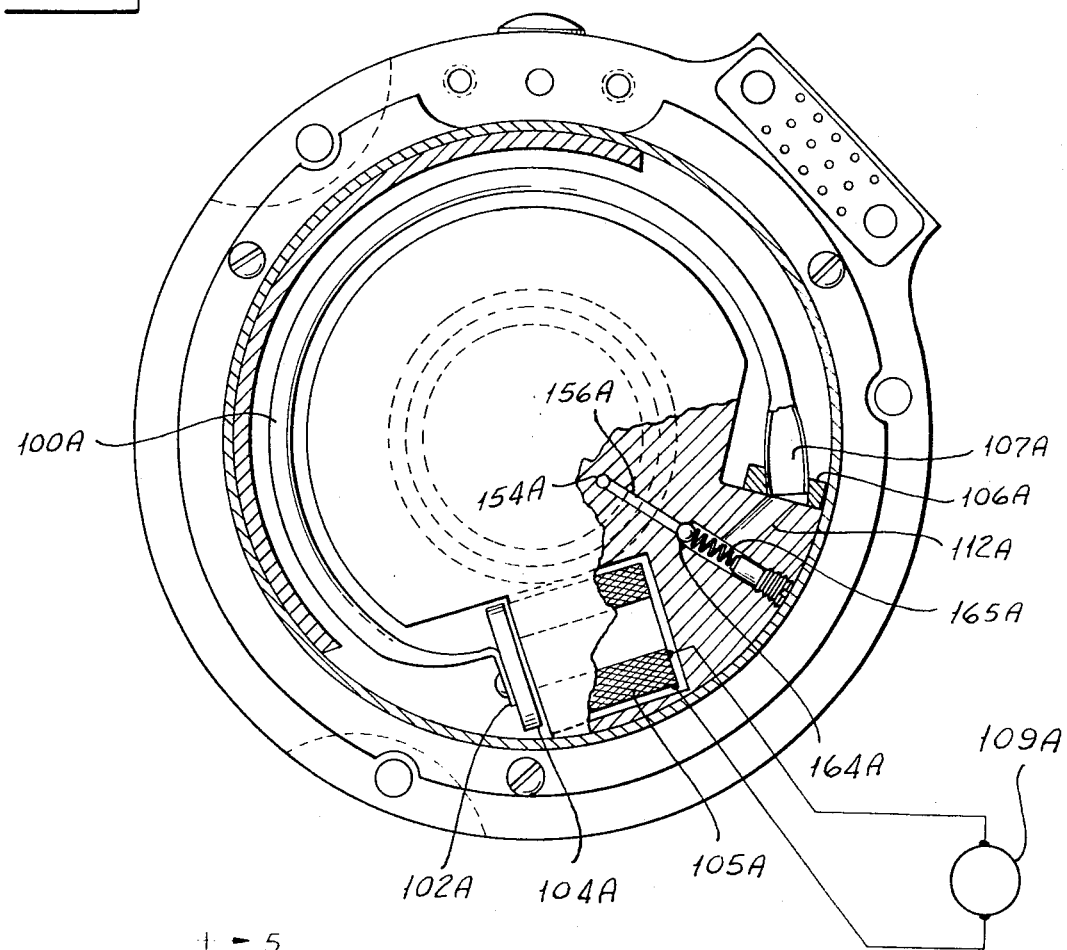
FIG. 5 is a sectional end view of a gyroscope housing showing a tube pump embodying a modified form of control valve means for the pump in which spring biased ball valves have been utilized for connecting the inlet and outlet of the flexible tube pump instead of the reed valves, shown in FIGS. 1 and 2.
Figure 6:
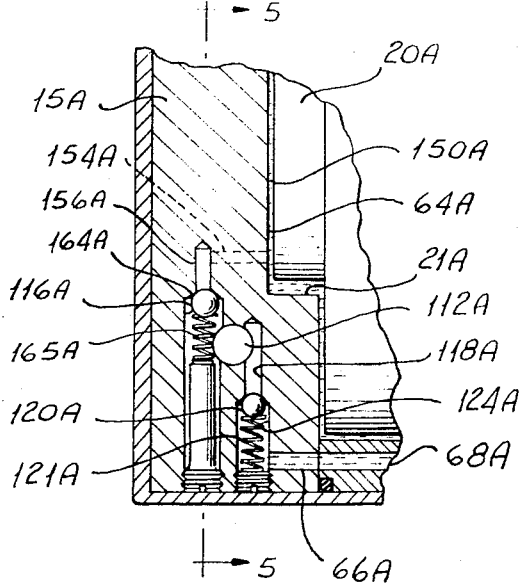
FIG. 6 is a fragmentary sectional view of the control valve means for the flexible tube pump so as to better illustrate the operative arrangement of the spring biased ball valves in relation to the inlet and outlet conduits to the flexible tubular pump which has been shown in the sectional view of FIG. 5 as taken along the line 5—5 of FIG. 6 and looking in the direction of the arrows.

A modified form of the invention is illustrated in FIGS. 5 and 6, in which corresponding parts to those heretofore described with reference to the invention of FIGS. 1-4 have been indicated by like numerals with the suffix A. Thus in the modified form of invention of FIGS. 5 and 6, there have been provided spring biased ball valves 164A and 120A. The ball valve 164A controlling the flow of inlet fluid through the passage 112A leading into the open end 107A of the Bourdon type tube pump 100A upon deenergization of the solenoid 105A, while the fluid medium in the Bourdon type tube 100A upon energization of the solenoid 105A being expelled through the conduit 112A effectively controlled by the spring biased ball valve 120A, as shown in FIG. 6.

The inlet controlled ball valve 164A is biased by a suitable spring 165A in a sense to close the port 156A leading from a fluid inlet passage 156A and opening to intake chamber 116A. The chamber 116A in turn connected to the conduit 112A leading to the inlet of the Bourdon type tube 100A. Further, as shown by FIG. 6, an outlet control valve 120A is biased by a suitable spring means 124A in a sense to close the outlet port 118A to the chamber 124A which is in turn connected through the channel 66A to the pressure channel 68A extending longitudinally in the housing 16, as heretofore explained.

It will be seen then that in the operation of the spring biased control ball valves of FIGS. 5 and 6, upon the solenoid 105A being energized the armature 104A moves towards the solenoid 105A bending the Bourdon tube 100A, as shown in FIG. 6, so as to decrease the interior volume of the tube 100A forcing the liquid in it through the outlet port 118A controlled by the ball valve 120A into the chamber 124A and thereby through the outlet port 66A. However, upon deenergization of the solenoid 105A, the tube 100A springs back under the inherent spring force thereof increasing the volume within tube 100A causing a decrease in the fluid pressure applied in the chamber 116A so that the intake fluid pressure applied at the channel 156A exceeds that in chamber 116A and is sufficient to bias the ball valve 164A into an open position resulting in a fluid flow through the inlet valve 164A into the channel 112A and thereby into the resilient tubular pump 100A.

MODIFIED FORM OF PUMP OF FIGURE 7

A further modified form of flexible tube pump 100B is shown in FIG. 7 in which corresponding numerals indicate corresponding parts to those heretofore described with reference to FIGS. 1-4, and which numerals bear the suffix B.

In the modified form of the invention of FIG. 7, there are provided jet type valves or restrictive orifices 120B and 164B in the outlet and inlet respectively to the Bourdon type pump 100B.

The jet type valves or restrictive orifices 120B in the outlet act in a sense to prevent a reverse flow of fluid medium in an inlet sense to the pump 100B, while the jet type valves or restrictive orifices 164B in the inlet to the pump 100B act in a sense to prevent a reverse flow of fluid medium in an outlet sense from the pump 100B.

The tube 100B is formed in a "C" or horse shoe shape with an outlet passage 106B leading from a point intermediate opposite end portions of the horse shoe shaped Bourdon tube 100B and opening through jet type outlet valves 120B to the outlet passage 66B, as shown in FIG. 7, while an inlet port 107B to the Bourdon type tube 100B is similarly positioned at a point intermediate the opposite end portions of the horse shoe shaped Bourdon tube 100B and leads through jet type inlet valves 164B from the inlet passage 156B.

Furthermore, the opposite end portions 102B of the Bourdon type tube 100B are connected to armature elements 104B arranged in cooperative relation in the solenoid 105B so that upon energization of the solenoid 105B, the respective armatures 104B move inwardly into the solenoid 105B so as to bend the Bourdon tube 100B. This action decreases the interior volume of the tube 100B forcing the fluid or liquid medium therein through the outlet jet type valves 120B into the outlet passage 66B. However, upon deenergization of the solenoid 105B, the tube 100B under the inherent spring force thereof springs back to its former position increasing the volume within it decreasing the fluid pressure therein and resulting in a fluid flow through the inlet jet type valves 164B from the inlet passage 156B to the interior of the flexible tube 100B.

MODIFIED FORM OF PUMP OF FIGURE 8

A further modified form of the invention is illustrated in FIG. 8 in which there is provided an "O" shaped Bourdon type tube pump having opposite free end leg portions 102C. An outlet passage 112C leads from a point intermediate the opposite ends of the Bourdon type tube 100C into an inlet-outlet control ball valve arrangement.

In the aforenoted arrangement, a ball valve 164C is biased by a spring 165C into a position for closing a connection between the passage 112C and the intake fluid pressure line 156C, while a ball valve 120C is biased by a spring 121C to close a connection between the passage 112C and the outlet passage 66C. However, opposite free end leg portions 102C of the "O" shaped flexible Bourdon type tube 100C are connected to armature portions 104C cooperatively arranged in relation to a magnetic core 103C of the solenoid 105C. Thus, upon energization of the solenoid 105C, the armature portions 104C move into the solenoid 105C so as to bend the Bourdon tube 100C at the opposite leg portions thereof. This action decreases the interior volume of the tube 100C forcing the fluid or liquid medium therein through outlet passage 112C and the outlet control ball valve 120C into the outlet passage 66C. However, upon deenergization of the solenoid 105C, the opposite legs of the tube 102C spring back increasing the volume with the tube 100C resulting in a decrease in the fluid pressure applied at the passage 112C causing a flow of fluid medium from the inlet passage 156C so as to bias the ball valve 164C to open the connection thereof with the inlet conduit 112C and thereby cause passage of the fluid medium into the opposite legs of the Bourdon type tube 100C.

MODIFIED FORM OF PUMP OF FIGURES 9 AND 10

In a still further modified form of the invention illustrated in FIGS. 9 and 10, there has been provided an "S" shaped Bourdon tube arrangement, as shown in FIG. 10, which has been found to be more resistant to shock and vibrational forces than the single canterlever designs of FIGS. 1-8. It will be seen that the arrangement of FIG. 10 is such that accelerational forces or shock would cause a compensating outlet pumping action with respect to one leg of the "S" shaped tube and an opposite intake action in the other leg of the "S" shaped tube resulting in a zero fluid output.

In the "S" shaped Bourdon tube arrangement of FIG. 10, the tube 100D is shown as an "S" shape having a body portion 98D from which there arcuately extends the opposite leg portions 99D and 101D. Opposite end portions of the legs 99D and 101D are connected at 102D to armatures 104D arranged in cooperative relation respectively to magnetic cores 103D of the electrical solenoids 105D.

Moreover at opposite sides of the body portion 98D, as shown by FIG. 9, extends a fluid inlet conduit 116D and a fluid outlet conduit 118D. The fluid inlet conduit 116D being controlled by a ball valve 164D normally biased by a spring 165D so as to close a passage 156D leading to a source of fluid pressure medium, while the fluid outlet conduit 118D is normally closed by a ball valve 120D biased under tension of a spring 121D to a position to close the conduit 118D to an outlet conduit 66D.

The arrangement is such then that upon the solenoids 105D being energized the respective armatures 104D at the free ends of the arms 99D and 101D will be biased towards the electromagnetic cores 103D of the respective solenoids 105D effecting an outward bending of the opposite legs 99D and 101D of the Bourdon tube 100D. This action will tend in turn to bias the respective arms 99D and 101D outwardly so as to increase the interior volume of the tube resulting in a decrease in the fluid pressure therein so as to permit the fluid pressure in the inlet passage 156D to bias the ball valve 164D into an open position. Thus the inlet fluid pressure medium may flow through the inlet valve 164D into the interior of the body portion 98D and the respective leg portions 99D and 101D of the "S" shaped Bourdon tube 100D.

However upon the respective solenoids 105D being deenergized, the legs 99D and 101D of the Bourdon tube will spring back to a position, shown in FIG. 10, decreasing the volume within the Bourdon type tube 100D and forcing fluid or liquid medium therein through the outlet valve passage 118D so as to cause the ball valve 120D to open to permit the fluid medium under the force applied by such action of the Bourdon tube to pass into the passage 66D.

OPERATION

From the foregoing, it will be seen that the present invention provides a flexible Bourdon tube in an assembly including the feature (1) of a motor or electrically controlled solenoid to actuate the Bourdon tube in an operative arrangement in which the tube functions as a low power input pump which may be utilized to supply fluid or liquid pressure medium to hydrostatically supported bearings of a gyroscope, as shown by FIG. 1.

The Bourdon tube may be operatively controlled by two reed valves (one at the inlet and the other at the outlet) which serve to rectify the oscillating fluid output of the tube as it vibrates, as shown by FIGS. 1–4.

Furthermore in the modified form of the invention, as shown in FIGS. 5 and 6, there may be provided the feature of an arrangement of ball valves to control a fluid inlet and outlet of the Bourdon type tube, while in another form of the invention, as illustrated in FIG. 7, there may be included jet type valves arranged at the inlet and outlet of the Bourdon type tube pump so as to provide no moving parts.

A further modified form of the Bourdon type tube pump may include the feature, as shown in FIGS. 9 and 10, of an "S" shaped Bourdon type tube arranged in a balanced relation so as to be resistant to shock and vibrational forces.

Furthermore, the arrangement may be such that upon the control solenoid being energized the armature moves toward it bending the Bourdon type tube in a sense to decrease the interior volume of the tube and forcing the fluid in the tube through the outlet valves into a resilient pressure chamber and into an outlet port. Alternatively the control solenoid may be so arranged in relation to the Bourdon type tube that upon energization, the Bourdon type tube may be bent in an opposite sense so as to increase the interior volume of the tube causing the liquid medium to pass from a suitable source into the tube.

However, upon deenergization of the solenoid, the Bourdon tube may spring back in an opposite sense causing in one case an increase in the volume within the tube resulting in a fluid flow through the inlet valve into the tube or in another case a decrease in the volume within the Bourdon tube causing a decrease in the volume and the fluid within the tube to be expelled.

As a further feature, cavitation problems in operation of the flexible tube may be avoided by pressurizing the entire system and providing the further feature of a resilient intake chamber and a resilient output chamber. As additional features, the electrical input frequency of the current energizing the controlling solenoid may be such as to match the mechanical frequency of the Bourdon tube so that very little energy need be used to operate the device and also in the case of the reed valves, heretofore described with reference to FIGS. 1–4, the reed valves may be tuned to the same natural period as that of the resonant tube pump.

The present invention includes the following features:

1. Use of a Bourdon tube as an output fluid or liquid pressure device.
2. High efficiencies may be effected by operating upon moving masses at resonant frequencies of the flexible tube pump.
3. The gyommetry of the resonant tube pump is such as to require little space and may be utilized to advantage in the compact assembly of gyroscopes utilizing hydrostatic bearings.
4. The Bourdon tube resonant pump provides a mechanical force amplification without linkages in which low solenoid forces in effect provide fluid pressure movements.
5. Use of resilient intake and outlet reservoirs in conjunction with pressurization of the system eliminate intake cavitation at high frequency. Furthermore, the use of two opposing Bourbon tubes in a "C," "O" or "S" shape provide a compact assembly for resistance to shock and vibrational forces.

While several embodiments of the invention have been illustrated and described, various changes in the form and relative arrangement of the parts, which will now appear obvious to those skilled in the art, may be made without departing from the scope of the invention.

I claim:

1. In a gyroscope of a type including housing means;
    fluid supply means within said housing means;
    a gimbal element carrying a gyroscopic rotor rotatable about a first axis;
    hydrostatic bearing means operable by said fluid supply means to support said gimbal element within said housing for pivotal movement about a second axis perpendicular to the first axis;
    the improvement in which said housing means includes a block mounted at one end of the housing means;
    the fluid supply means includes a flexible tubular member having one portion thereof fixedly mounted in the end block;
    said one portion of the tubular member including fluid inlet and outlet port means opening into an interior channel in the tubular member and from the interior channel of the tubular member for supplying fluid medium to the hydrostatic bearing means under pressure;
    another closed end portion of the tubular member being freely positioned in the end block;
    an electrical motor means mounted in the end block and including armature means mounted on the free closed end portion of the tubular member;
    a stator element of the motor means mounted in the end block and arranged in cooperative relation with the armature means for applying an actuating force to the free closed end portion of the tubular member so as to act in a sense in opposition to a biasing force of the flexible member acting in another sense;
    one of said opposing forces acting on said tubular member to flex the member in a sense to decrease an effective volume of the interior channel in the tubular member so as to force fluid medium in the channel out through the fluid outlet port means opening from the interior channel in the tubular member;
    the other of said opposing forces acting on said tubular member to flex the member in another sense so as to increase the effective volume of the interior channel in the tubular member so as to draw fluid medium through the fluid inlet port means into the interior channel in the tubular member;
    the end block includes an internal fluid pressure outlet chamber and an internal fluid pressure inlet chamber;
    fluid control means selectively operable by the pressure of the fluid medium in said chambers for connecting the internal fluid pressure outlet and inlet chambers alternately through the fluid inlet and outlet port means to the interior channel in the tubular member dependent upon the sense in which the opposing forces act to deflect the tubular member.

2. The improvement defined by claim 1 in which the fluid control means includes a pair of reed valves,
    one of said pair of reed valves acting in a sense to open the internal fluid pressure outlet chamber through the fluid outlet port means to the interior channel in the tubular member upon said tubular member being forced in a sense to decrease the effective volume of the interior channel in the tubular member so as to force fluid medium therein out through the outlet port means and said one reed valve into the internal fluid outlet pressure chamber;
    and the other of said pair of reed valves being effective to open the internal fluid inlet pressure chamber into the interior channel of the tubular member upon the said tubular member being forced in a sense to increase the effective volume of the interior channel in the tubular member so that fluid medium may be drawn through the inlet port means and the other of said pair of reed valves from the internal fluid inlet pressure chamber into the interior channel in the tubular member.

3. The improvement defined by claim 1 in which
the fluid control means includes a pair of spring biased ball valves
one of said pair of ball valves acting in a sense to open the internal fluid pressure outlet chamber through the fluid outlet port means to the interior channel in the tubular member upon said tubular member being forced in a sense to decrease the effective volume of the interior channel in the tubular member so as to force fluid medium therein out through the outlet port means and the one ball valve into the internal fluid outlet pressure chamber;
and the other of said pair of ball valves being effective to open the internal fluid inlet pressure chamber into the interior channel of the tubular member upon the said tubular member being forced in a sense to increase the effective volume of the interior channel in the tubular member so that fluid medium may be drawn through the inlet port means and the other of said pair of ball valves from the internal fluid inlet pressure chamber into the interior channel in the tubular member.

4. The improvement defined by claim 1 in which
the fluid control means includes two sets of jet type valves,
one set of said jet type valves acting in a sense to open the internal fluid pressure outlet chamber through the fluid outlet port means to the interior channel in the tubular member upon said tubular member being forced in a sense to decrease the effective volume of the interior channel in the tubular member so as to force fluid medium therein out through the outlet port means and said one set of said jet type valves into the internal fluid outlet pressure chamber;
and another set of said jet type valves being effective to open the internal fluid inlet pressure chamber into the interior channel of the tubular member upon the said tubular member being forced in a sense to increase the effective volume of the interior channel in the tubular member so that fluid medium may be drawn through the inlet port means and the other set of said jet type valves from the internal fluid inlet pressure chamber into the interior channel in the tubular member.

5. The improvement defined by claim 1 in which
the internal fluid pressure outlet chamber includes a resilient outlet chamber,
the internal fluid pressure inlet chamber includes a resilient inlet chamber,
and the resilient inlet and outlet chambers being effective to prevent cavitation in the inlet and outlet flow of the fluid medium in the interior channel of the tubular member.

6. The improvement defined by claim 1 in which
the motor means includes a solenoid,
and means to energize the solenoid by an electrical current of a frequency matching the mechanical resonant frequency of the flexible tubular member.

7. The improvement defined by claim 1 in which the control means includes a pair of reed valves,
one of said pair of reed valves acting in a sense to open the internal fluid pressure outlet chamber through the fluid outlet port means to the interior channel in the tubular member upon said tubular member being forced in a sense to decrease the effective volume of the interior channel in the tubular member so as to force fluid medium therein out through the outlet port means and said one reed valve into the internal fluid outlet pressure chamber;
and the other of said pair of reed valves being effective to open the internal fluid inlet pressure chamber into the interior channel of the tubular member upon the said tubular member being forced in a sense to increase the effective volume of the interior channel in the tubular member so that fluid medium may be drawn through the inlet port means and the other of said pair of reed valves from the internal fluid inlet pressure chamber into the interior channel in the tubular member;
the pair of reed valves being tuned to a frequency equal to that of the natural frequency of the resilient tubular member.

8. The improvement defined by claim 1 in which
the one portion of the flexible tubular member being at one end thereof and fixedly mounted at said one end portion in the end block;
the member having the fluid inlet and outlet port means opening into the interior channel in the tubular member at said fixed one end,
and the other free closed end portion being at an opposite end of the tubular member and having the armature mounted at said other end in cooperative relation with the stator element of the motor means.

9. The improvement defined by claim 1 in which
the flexible tubular member includes the one portion thereof intermediate opposite other closed end portions of the tubular member;
said one portion being fixedly mounted in the end block;
the member having the fluid inlet and outlet port means opening into the interior channel in the tubular member at the fixed one portion thereof;
the armature means including armature elements mounted at the opposite other closed end portions of the tubular member and arranged in cooperative relation with the stator element of the motor means.

10. The improvement defined by claim 1 including
the flexible tubular member being formed in a substantially "S" shape and having a body portion intermediate opposite closed end portions of the tubular member;
the body portion being fixedly mounted in the end block;
the member having the fluid inlet and outlet port means opening into the interior channel in the flexible tubular member at said fixed one portion;
the armature means including an armature element mounted on each of the closed free end portions of the tubular member and arranged in cooperative relation with the stator element of the motor means;
and the "S" shaped tubular member being so arranged that radial shock and vibrational forces applied thereto may be counterbalanced by a resultant effect on the opposite closed free end portions of the "S" shaped tubular member.

11. In a gyroscope of a type including housing means;
fluid supply means within said housing means;
a gimbal element carrying a gyroscopic rotor rotatable about a first axis;
hydrostatic bearing means operable by said fluid supply means to support said gimbal element within said housing for pivotal movement about a second axis perpendicular to the first axis;
the improvement in which said housing means includes a block mounted at one end of the housing means;
the fluid supply means includes a flexible chamber means to provide a variable volume fluid container;
inlet and outlet port means for the flexible chamber means;
means connecting the inlet and outlet port means to the hydrostatic bearing means for circulation of fluid medium through the inlet port means from the bearing means into the flexible chamber means and through the outlet port means from the flexible chamber means to the bearing means;
the connecting means including a first unidirectional fluid flow restricting means operable in one sense for preventing a reverse flow of fluid medium from the flexible chamber means through the inlet port means to the bearing means and a second unidirectional fluid flow restricting means operable in another sense for preventing a reverse flow of fluid medium from the bearing means through the outlet port means into the flexible chamber means;

the flexible chamber means being mounted within the block mounted at one end of the housing means;

an electric motor means mounted in said end block and operably arranged in relation to the flexible chamber means to provide a force to actuate the flexible chamber means in one sense to decrease the effective volume of the flexible chamber means so as to force fluid medium out through the fluid outlet port means from within the flexible chamber means to the bearing means;

said electric motor means being operably arranged in relation to the flexible chamber means to provide a force to actuate the flexible chamber means in another sense so as to increase the effective volume of the flexible chamber means so as to draw fluid medium through the fluid inlet port means from the hydrostatic bearing means into the flexible chamber means;

the first unidirectional fluid flow restricting means includes fluid flow control valve means arranged in said inlet port means and operable in said one sense;

and the second unidirectional fluid flow restricting means includes another fluid flow control valve means arranged in said outlet port means and operable in said other sense.

12. In a gyroscope of a type including housing means;

fluid supply means within said housing means;

a gimbal element carrying a gyroscopic rotor rotatable about a first axis;

hydrostatic bearing means operable by said fluid supply means to support said gimbal element within said housing for pivotal movement about a second axis perpendicular to the first axis;

the improvement in which said housing means includes a block mounted at one end of the housing means;

the fluid supply means includes a flexible chamber means to provide a variable volume fluid container;

inlet and outlet port means for the flexible chamber means;

means connecting the inlet and outlet port means to the hydrostatic bearing means for circulation of fluid medium through the inlet port means from the bearing means into the flexible chamber means and through the outlet port means from the flexible chamber means to the bearing means;

the connecting means including a first unidirectional fluid flow restricting means operable in one sense for preventing a reverse flow of fluid medium from the flexible chamber means through the inlet port means to the bearing means and a second unidirectional fluid flow restricting means operable in another sense for preventing a reverse flow of fluid medium from the bearing means through the outlet port means into the flexible chamber means;

the flexible chamber means being mounted within the block mounted at one end of the housing means;

an electric motor means mounted in said end block and operably arranged in relation to the flexible chamber means to provide a force to actuate the flexible chamber means in one sense to decrease the effective volume of the flexible chamber means so as to force fluid medium out through the fluid outlet port means from within the flexible chamber means to the bearing means;

said electric motor means being operably arranged in relation to the flexible chamber means to provide a force to actuate the flexible chamber means in another sense so as to increase the effective volume of the flexible chamber means so as to draw fluid medium through the fluid inlet port means from the hydrostatic bearing means into the flexible chamber means;

the first unidirectional fluid flow restricting means includes restrictive orifice means being arranged in said inlet port means and operable in said one sense;

and the second unidirectional fluid flow restricting means includes other restricted orifice means arranged in said outlet port means and operable in said other sense.

* * * * *